UNITED STATES PATENT OFFICE.

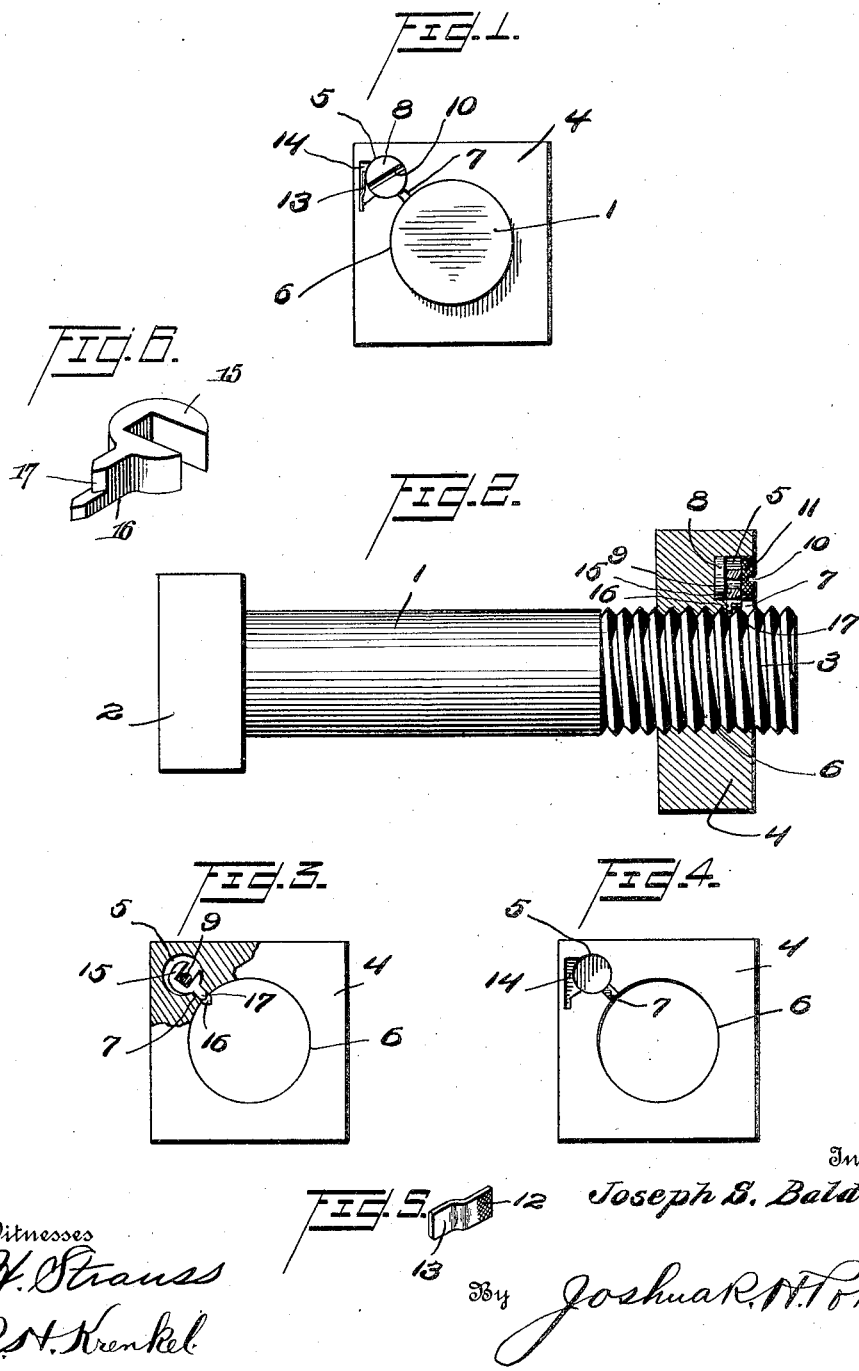

JOSEPH S. BALDWIN, OF KING OF PRUSSIA, PENNSYLVANIA.

NUT-LOCK.

1,057,612. Specification of Letters Patent. Patented Apr. 1, 1913.

Application filed March 20, 1912. Serial No. 684,949.

*To all whom it may concern:*

Be it known that I, JOSEPH S. BALDWIN, a citizen of the United States, residing at King of Prussia, in the county of Montgomery and State of Pennsylvania, have invented certain new and useful Improvements in Nut-Locks, of which the following is a specification.

My invention relates to improvements in nut locks, the object of the invention being to provide a nut with improved locking means carried by the nut, and which may be operated to engage the threads of the bolt and lock the nut against turning movement. A further object is to provide a nut locking means of this character which may be turned to lock or unlock, so that the nut may be removed from the bolt at any time desired.

With these and other objects in view, the invention consists in certain novel features of construction and combinations and arrangements of parts as will be more fully hereinafter described and pointed out in the claims.

In the accompanying drawings: Figure 1, is a view in end elevation illustrating my improvements. Fig. 2, is a view in section through the nut showing the same in position on a bolt. Fig. 3, is a view partly in elevation and partly in section showing the locking mechanism in locked position. Fig. 4, is a view of the nut with the locking mechanism removed. Fig. 5 is a perspective view of the spring which holds the locking mechanism against accidental movement, and Fig. 6, is a detail perspective view of the locking member on an enlarged scale.

1, represents an ordinary bolt having a head 2 at one end, and screw threads 3 at its other end.

4, is my improved nut having a screw-threaded opening 6 to receive the threads 3 of the bolt, and provided in its outer face, in one corner, with a circular recess 5 which communicates with the threaded opening 6 by means of a groove 7. In the circular recess 5, a rotary member 8 is located and comprises two circular disks connected by an integral eccentric pin 9. The outer circular disk has a screw-driver receiving slot 10 therein to facilitate the turning thereof, and this outer disk is made with a milled periphery 11 engaged by a milled surface 12 on the free end of a spring 13. This spring 13 is located in a triangular shaped recess 14 in the outer face of the nut, and one end is secured to the nut in any approved manner. The crank pin 9, connecting the two disks, extends through a disk 15, and this disk 15 having an angular recess therein extending inwardly from one edge to a point beyond the center of the disk is provided with a spur 16. This spur 16 is adapted to project through the groove 7, and engage between the threads 3 of the bolt, and on its outer face is provided with a cutting tool 17 which bites into the threads of the bolt. In other words, this projection on the disk 15 is of stepped form as shown most clearly in Figs. 2, and 3, the outer portion constituting a sharp tooth 17 to bite the threads, while the inner portion is longer and projects between the threads of the bolt. This spur and tooth are projected or withdrawn by turning the disks 8 which is accomplished by employing any ordinary screw-driver. As the pin 9 is eccentrically located, the rotary motion of the disks will cause the spurs 16 and tooth 17 to move toward or away from the threads of the bolt, so that the latter may be locked or released. The spring 13 holds the parts in any position of adjustment.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a nut having a circular recess in one face, of a rotary member fitting the circular recess and comprising two disks spaced apart with an eccentric pin connecting them, a locking member located between the disks and having a recess receiving the crank pin, and a tooth on said locking member adapted to be projected into engagement with the threads of the bolt by the rotary movement of said locking member, substantially as described.

2. In combination with a nut having a recess in one face, a locking member positioned in the said recess, a support on said locking member adapted to be projected between the threads of a bolt when the latter is positioned in the nut, a tooth integral with said support and adapted to bite into the threads of the bolt, and means for advancing the tooth and spur toward the bolt, substantially as described.

In testimony whereof I have signed my name to this specification in the presence of two subscribing witnesses.

JOSEPH S. BALDWIN.

Witnesses:
J. LEROY SCHWEYER,
CHAS. E. POTTS.

Copies of this patent may be obtained for five cents each, by addressing the "Commissioner of Patents, Washington, D. C."